Aug. 10, 1965   F. W. R. STARP   3,199,425
PHOTOGRAPHIC CAMERA WITH CONTROL INTERLOCKS
Filed March 21, 1963
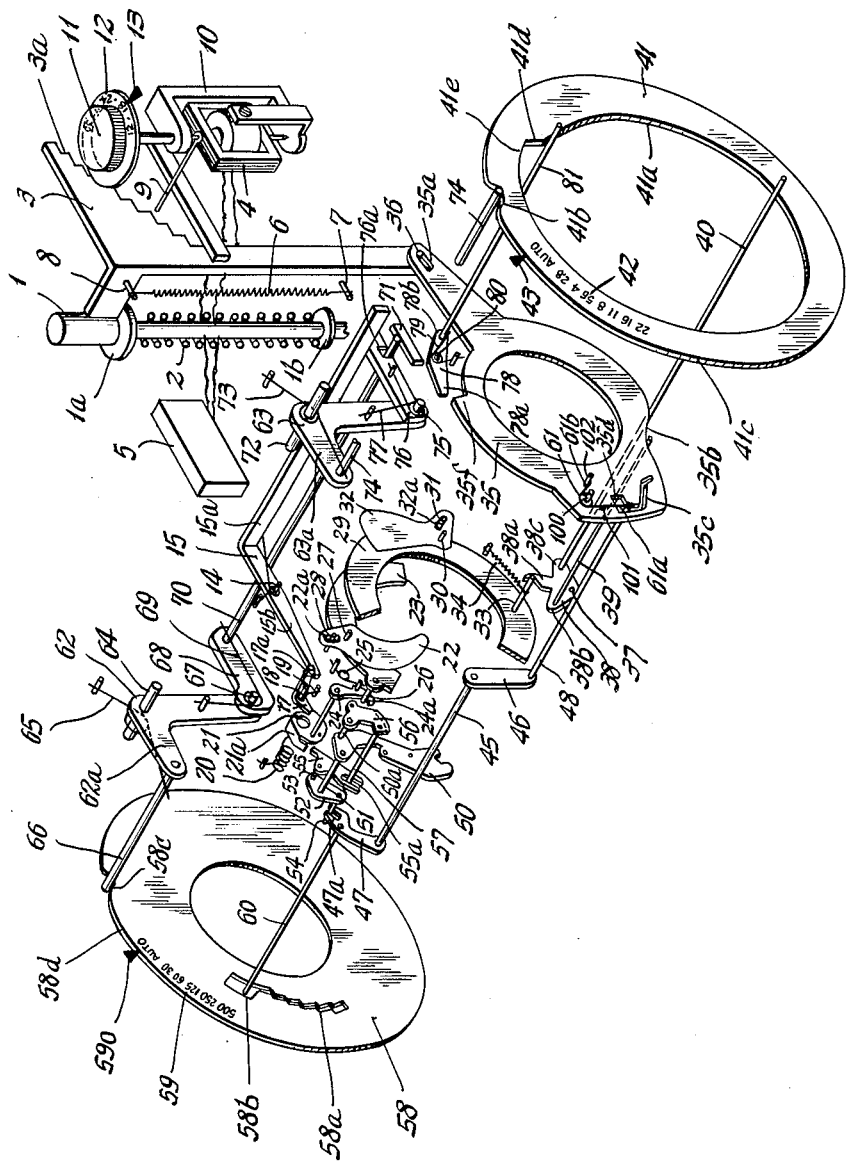
INVENTOR.
Franz W. R. Starp
BY
Arthur A. March
ATTORNEYS United States Patent Office 3,199,425
Patented Aug. 10, 1965

3,199,425
PHOTOGRAPHIC CAMERA WITH CONTROL
INTERLOCKS
Franz W. R. Starp, Calmbach (Enz), Germany, assignor to Alfred Gauthier, G.m.b.H., Calmbach (Enz), Germany, a corporation of Germany
Filed Mar. 21, 1963, Ser. No. 267,023
8 Claims. (Cl. 95—10)

The invention relates to a photographic camera having a plurality of controls which can be set at different operating positions or ranges but which must be set to certain positions or ranges that are mutually related to each other.

The main object of the present invention is to provide a simple interlocking arrangement that will prevent operation of the shutter release trigger except when the controls are properly correlated. This arrangement makes it impossible, when using a camera that can be set at different work ranges, for the photographer, owing to lack of attention, to take photographs with incorrect settings of the controls, for example, with one control set to an automatic position and another control set to a manual position before a photograph is taken.

In accordance with the invention, at least two independently movable interlock members are connected to the controls which must be interlocked. These interlock members are so shaped that, when properly positioned with respect to each other, they telescope together, but when not so positioned, they remain apart. The shutter release trigger engages the interlock members, and unless they are telescoped together will not move far enough to release the shutters. When one of the controls is changed to a different part of its operating range, say from a manually operated position to an automatic position, the corresponding interlock member is moved, and the other control or controls must also be changed to a corresponding automatic position in order for the shutter release trigger to be able to work.

Details of the invention will become apparent from the description that follows and the accompanying drawing which shows a perspective, axially extended view of an embodiment of the subject matter of the invention.

Referring now to the drawing, a shutter release trigger 1 is located in a camera housing (case) not shown for reasons of clarity and is pressed upwardly by a spring 2. For automatic exposure setting, a sensing member 3 engages a flange 1a on the shutter release trigger 1 to move therewith so as to sense, in a manner known per se, the position of a movable measuring-mechanism member 4 of an exposure meter, which is built into the camera and is fed by the current of a photocell 5.

The sensing member 3 is pulled downwardly by a tension spring 6, one end of which is hooked onto a fixed pin 7, and the other end of which is hooked into a pin 8 of the sensing member 3. The tension spring 6 is weaker than the spring 2, so that the sensing member 3 occupies the starting position shown in the drawing when the shutter trigger is not actuated. For the purpose of cooperation with the movable member 4 of the exposure meter, the sensing member 3 has a stepped cam 3a, the steps of which are pulled into engagement with a needle 9 of the movable measuring-mechanism member 4 by the force of the tension spring 6 upon depression of the camera release member 1. The movable measuring-mechanism member 4 of the exposure meter is positioned in a U-shaped carrier 10, the basic position of which can be changed by means of an adjusting knob 11 for the purpose of taking into consideration different film sensitivities according to a film sensitivity scale 12 which is arranged on the adjusting knob 11 and cooperates with a fixed mark 13.

A flange 1b on the trigger 1 is associated with a two-armed release lever 15 pivotally positioned about a fixed axle 14. One arm 15a of the release lever is bent at right angle and is located in the path of motion of the collar 1b, while the other arm 15b engages a bent-off lug 17a of an arresting lever 17. The latter is pivotally positioned about a pin 18 and is kept in engagement with the release lever 15 by a spring 19. The arresting lever 17 holds a main driving disc 21 of the shutter in its cocked position as shown in the drawing, against the pressure of a driving spring 20. The driving disc 21 is rigidly connected to a cocking shaft (not shown in the drawing), which, in turn, is connected in a well known manner to a cocking device or mechanism, such as the film transport device of the camera.

A plurality of shutter blades 22 is attached to an actuating ring 23, which is arranged coaxially with the shutter axis and is operated by a driving pawl 24 articulately connected to the driving disc 21. The driving pawl 24 is pressed upon by a spring 25 so that its jaws 24a engage a pin 26 on the ring 23. The shutter blades 22, only one of which is shown in the drawing for reasons of clarity, are pivotally mounted on studs 27 and are provided with slots 22a, which are fitted over fixed pins 28 so that, when the driving disc 21 is rotated in the counterclockwise direction, the shutter blades 22 execute a reciprocating motion for the purpose of opening and closing the exposure aperture.

A diaphragm actuating ring 29 which is also located in the shutter housing coaxially with the ring 23 carries pins 30 on which the diaphragm lamellae 32 are pivotally mounted. The lamellae (only one of which is shown) have slots 32a that engage fixed studs 31. The diaphragm actuating ring 29 has an additional pin 33 to which a spring 34 is attached to retain the ring 29 in the starting position corresponding to the largest diaphragm aperture as shown in the drawing.

For the purpose of effecting exposures with automatic diaphragm setting according to a predetermined time diaphragm program, a program setting ring 35 is provided, which has a slot 35a that fits over a pin 36 on the sensing member 3. The ring 35 is provided with control cams 35b and 35c, which control the operation of both the diaphragm actuating ring 29 and an exposure time, or shutter speed, escapement mechanism which will be described below. The program setting ring 35 is linked to the diaphragm actuating ring 29 by a three-armed lever 38 which is pivotally mounted on an axle 37. The pin 33 of the diaphragm actuating ring 29 is pulled against one lever arm 38a by the spring 34. The other arms 38b and 38c of the lever carry pins 39 and 40, which serve respectively as cam followers for the control cam 35b of the program setting ring 35, and a cam 41a on diaphragm aperture control 41. The control 41 has a diaphragm scale 42, which is positioned by reference to a mark 43. The manual setting range defined by the diaphragm scale 42, within which the diaphragm actuating ring 29 is influenced by means of the control cam 41a, is followed by an "Auto" setting position of the control 41, in which the cam 35b of the program setting ring 35, instead of the cam 41a, sets the diaphragm lamellae 32.

For the automatic setting of both the exposure time and diaphragm aperture size, a system of levers is provided, which cooperates with the shutter speed escapement mechanism of the shutter and which can be influenced by the control cam 35c of the program setting ring 35. The system of levers comprises a pivot shaft 45 which carries a lever 46 at one end and a lever 47 at the other. A pin 48, which engages the cam 35c as a cam follower, is affixed to the lever 46 while the lever 47 is operatively connected to the shutter speed escapement mechanism in a manner to be described hereinafter.

The shutter speed escapement mechanism consists of a carrier plate 50, with a pin 51 on which a two-armed lever 52 is pivotally mounted. The two arms of said lever are provided with oppositely extending pins 53 and 54 of which the pin 53 forms the axis of rotation for an operating lever 55 cooperating with the main driving disc 21, while the pin 54 engages a slot 47a of a lever 47. Thus, the operating lever 55 is connected to the control cam 35c so that, when the ring 35 is actuated, the operating lever 55 is displaced with respect to the main driving disc 21 of the shutter. The operating lever 55 has a slot 55a which is engaged by a pin 57 fixed on a driving segment 56 of the escapement mechanism. The driving segment 56 which meshes with other gear members (not shown) of the escapement mechanism, is pivotally positioned about a pin 50a on a carrier plate 50 and is influenced by a spring (not shown in the drawing), which tends to keep the segment in the starting position shown.

In order to be able to effect the setting of the exposure time escapement mechanism automatically by means of the program setting ring 35 as well as manually, the invention provides for the arrangement of an exposure-time, or shutter speed control 58, preferably in the form of a ring, by means of which the exposure-time escapement mechanism may be set by way of the lever 47 independently of the program setting ring 35. For this purpose, the shutter speed control 58 comprises a control cam 58a, which cooperates with a pin 60 extending from the lever 47. The setting of the control 58 is indicated by the relative position of an exposure-time scale 59 on the control 58 and pointer 590. In addition to the scale 59 which defines the manual setting range, the control 58 also has a setting position identified by the word "Auto" in which the automatic exposure-time setting is operative.

Since the cam 35c controls the shutter speed only when the control 58 is set for automatic operation, while the cam 58a controls the shutter speed only when the control 58 is set at one of its manual positions, and since a rigid linkage connects both of these cams to the shutter speed escapement mechanism, cut-out sections 35d and 58b must be provided at corresponding points of the respective cams to allow movement of both ends of the linkage. The opening 35d is associated with the starting position of the program setting ring 35, and the opening 58b is associated with the "Auto" setting position of the shutter speed control 58, so that, upon manual setting of the shutter speed, the pin 48 of the transmission device 45 to 48 is freely movable in the opening 35d of the program setting ring 35, while upon setting the controls for automatic program-exposure operation, the opening 58b of the setting member 58 gives the pin 60 the required freedom of motion. In order to keep the pin 48 from entering the opening 35d and at the same time to keep the pin 60 from entering the opening 38b by inadvertent rotation of the cutting linkage including pin 45, a spring 61 is placed on a pin 100 on the program setting ring 35 so that one end 61a bears against the pin 48. The spring is held in place by pin 101 so that it does not pinch the pin 48 and make it difficult for the ring 35 to move in the event of automatic operation of the camera, but at the same time the spring end 61a can easily be deflected by the pin 48 if the shutter speed control 58 is rotated so that the pin 60 rides up along the cam 58a. The spring end 61b is held in place by a third pin 102.

In order to avoid faulty exposures due to setting the shutter speed control 58 at some point other than the "Auto" position when the diaphragm aperture control 41 is set for automatic operation, a locking system is provided which includes two independent and movable levers 62 and 63. The lever 62 is pivotally mounted on a shaft 64 and is spring biased counterclockwise by a spring 65 which bears against a pin 66 at one end 62a of the lever 62. The pin 66 acts as a follower to transmit to the lever 62 movements produced by rotation of the shutter speed control 58 and particularly counterclockwise movement of the lever 62 that is permitted when the pin 66 enters the depression or detent 58c and the clockwise movement caused when the pin 66 is forced to ride up along the edge 58d. At the other end of the lever 62 is a hinge pin 67 to which a bar 68 is attached so that the bar is free to pivot with respect to the lever 62 but is urged in a clockwise direction by means of a spring 69 which bears against a pin 70 that extends from the bar 68 and rests upon a fixed stop 71.

Lever 63 is similar to lever 62 and is also urged in a counterclockwise direction about a pivot shaft 72 by means of a spring 73 that bears on a pin 74 at one end 63a of the lever 63 which extends into contact with the outer periphery 41c of the aperture control ring 41. At the other end of the lever 63 is a hinge pin 75 to which a locking bar 76 is attached so as to pivot with respect to the lever 63. The bar is urged in a clockwise direction by a spring 77 and is provided with a recess or opening 76a which cooperates with the pin 70.

The diaphragm control ring 41 is in the "Auto" position, the pin 74 rests within a depression 41b which permits the lever 63 to rotate to its maximum counterclockwise extent and when the shutter speed control 58 is also in its "Auto" position the pin 66 is in the depression 58c and the lever 62 is also in its most counterclockwise position. When both of these levers are so located the recess 76a is directly above the pin 70. Likewise, when both of the controls 41 and 58 are in one of their manually controlled positions, the respective pins 74 and 66 must be out of the depressions 41b and 58c and the levers 62 and 63 are therefore rotated to their most clockwise positions and the pin 70 is still directly under the recess 76a. However, when either one of the controls 41 or 58 is in its "Auto" position and the other control is in one of its manually controlled range of positions, one of the levers 62 or 63 will be rotated clockwise and the other counterclockwise thus shifting the relative positions of the pin 70 and the slot 76a so that the pin will not be directly under the slot.

When a photograph is to be taken the shutter release trigger 1 is depressed and a flange 1b presses against the arm 15a of the shutter release lever. This arm in turn presses against the upper surface of the locking bar 76. If, and only if, the pin 70 is directly under the recess 76a will it be possible for the arm 15a to be pushed downwardly far enough to permit the shutter actuating members to operate. Otherwise, the arm 15a will simply hit against the top of the locking bar 76 and the lower surface of the locking bar will press against the pin 70 which cannot move downwardly because it is resting on the fixed stop 71, and as a result, no photograph can be taken.

It should be noted that the edge 58d of the shutter speed control 58 is substantially circular except for the depression 58c, so that the lever 62 moves from a fully counterclockwise position when the control is set in its "Auto" position to a fully clockwise position when the control is set at any of its manually controlled positions. Correlatively, the bar 68 and pin 70 move directly from one extreme position to the other, one of the extreme positions corresponding to the "Auto" setting of the control, and the other extreme position corresponding to all of the positions of the control 58 in its manually controlled range 59. Similarly, the bar 76 moves to only two positions, one of which corresponds to the "Auto" setting of the diaphragm control 41 and the other to all of the diaphragm settings in the manually controlled range 42. Therefore, the pin 70 will fit into the slot 76 at any manually set shutter speed on the range 59 provided only that the diaphragm control 41 is set to any of the diaphragm settings in the manually controlled range 42. The interfitting of the pin 70 and the slot 76a when both controls are in their "Auto" positions has already been described.

As is also apparent from the drawing, an arresting lever 78 biased by a spring 79 and pivotally mounted on a fixed pin 80 is associated with the program setting ring 35. The purpose of this arresting lever is to retain the ring 35 as well as the sensing member 3 in a starting position when the diaphragm aperture control 41 is set to its manually controlled range of positions and thereby to keep the sensing member 3 from controlling the diaphragm actuating ring 29 as well as from the shutter speed escapement mechanism. In order to lock the ring 35 against movement, the arm 78a of the lever 78 engages a projection 35f when a pin 81, which extends from the other arm 78b, engages section 41e of the inner circumference of the diaphragm setting control 41. In the "Auto" setting position of the setting member 41, the peak of the cam 41a is opposite the pin 81, which keeps the arresting lever 78 rotated clockwise against spring action as shown in the drawing. But if the control 41 is moved to the range of the diaphragm scale 42, the pin 81 reaches the range of the radially lower region 41e. The resulting pivoting motion of the lever 78 moves the arm 78a into the path of motion of the projection 35f of the program setting ring 35 and locks the latter against clockwise motion. The setting of the diaphragm lamellae 32 is now determined by the cam 41a which is linked to the diaphragm actuating ring 29 by way of the pin 40 and the lever 38.

The mode of operation of the camera according to the invention is the following:

In the drawing, the camera is set, according to a predetermined time/diaphragm program, at an automatic exposure setting determined by the light intensity and by the film sensitivity set, for which purpose the shutter speed control 58 and the diaphragm aperture control 41 have been moved into their "Auto" setting positions. When the controls are in this position, the arresting lever 78 is outside the path of motion of the program setting ring 35. In addition, the cam 41a of the diaphragm setting member 41 occupies a position such that it no longer influences the pin 40, so that the lever 38 is able to engage, by means of its pin 39, the cam 35b of the program setting ring 35. Furthermore, the cam 58a of the exposure-time setting member 58 is disconnected from the shutter escapement mechanism because the opening 58b is opposite the pin 60 when the setting member 58 is in the "Auto" position. Finally, the two levers 62 and 63 with their pins 66 and 74 are in the concave portions 41b and 58c of the controls 41 and 58 respectively, which causes the pin 70 and the slot 76a of the bar 76 to occupy the position shown in the drawing. If, in this position of the camera, the shutter trigger 1 is depressed in order to take a photograph, the sensing member 3 follows along due to the action of the spring 6 until one of its steps 3a impinges on the needle 9 of the movable measuring-mechanism member 4. In response to this motion of the sensing member, the program setting ring 35 is also simultaneously rotated in clockwise direction. This, in turn, has the effect that the pin 48 of the transmission device 45 to 48 cooperating with the exposure-time escapement mechanism slides along in the setting cam 35c and sets the exposure time by adjusting the lever 52, and thereby the operating lever 55, in accordance with the distance traveled. Upon the rotary motion of the program setting ring 35 and simultaneously with the exposure time setting cam 35c, the diaphragm setting cam 35b also becomes operative, and forces the pin 39 to push the lever 38 in the counterclockwise direction, which, in turn, moves the diaphragm actuating ring 29 and the diaphragm lamellae 32 into a position corresponding to the distance traveled by the ring 35. This completes the automatic exposure setting according to a predetermined time/diaphragm program.

Upon further depression of the camera release member 1, the collar or flange 1b strikes the arm 15a pivoting the release lever 15 in the clockwise direction, in which case the opening 76a is in position to receive the pin 70. This causes the arresting lever 17 to be removed from engagement with the cocking and driving disc 21 so that the disc is free to run down under the force of the spring 20.

Depending on the setting of the operating lever 55 of the shutter-speed escapement mechanism, the projection 21a of the driving disc 21 engages, over a shorter or longer distance, with the operating lever 55. In so doing, the driving disc 21 pivots the operating lever 55 about the pin 53 and is again removed from engagement with the lever after having traveled a distance determining the exposure time. Simultaneously with this process, the driving ring 23 which is articulately connected to the driving disc 21 by way of the driving pawl 24 and the pin 26, is moved back and forth, causing the shutter blades 22 to swing from the closed position (shown in the drawing) to their greatest aperture width and subsequently to return again to their closed position.

In order to effect exposures with manual setting of shutter speed and diaphragm aperture size, it is merely necessary to rotate both of the controls 41 and 58 clockwise from the "Auto" position until the desired diaphragm and shutter speed values of the scales 42 and 59 are opposite the fixed marks 43 and 590. During this setting process the pins 66 and 74 move out of the concave portions 41b and 58c of the control edges 41c and 58d, pivoting the levers 62 and 63 clockwise by the same amount, thus causing the pin 70 and the opening 76a to maintain their previous relative position with respect to each other. Upon rotation of the diaphragm control 41, the cam 41a also becomes operative, which is linked by the pin 40 and the lever 38, to the diaphragm actuating ring 25, moving the latter into a position corresponding to the diaphragm aperture that has been set. In addition, upon rotation of the exposure-time setting member 58, the operating lever 55 of the escapement mechanism is set in relation to the projection 21a of the shutter driving disc 21 by means of the linkage 45 to 48, which is now controlled by the cam 58a. As a result, the pin 48 moves against the action of the spring 61 into the opening 35d of the program setting ring 35. And finally, due to the setting of the diaphragm control member 41, the pin 81 leaves the cam 41a and the sloping edge 41d and comes into engagement with the concentrically extended control edge 41e of the diaphragm setting member, thus pivoting the arresting lever 78 counterclockwise due to the action of its spring 79, and causing both the program setting ring 35 and the sensing member 3 connected thereto to be locked in their starting positions.

If the shutter release trigger 1 is now depressed, it drives the lever 15 and the locking bar 76 downwardly, while the sensing member 3 maintains its starting position owing to the locking of the program setting ring 35. The lever 15 actuates the arresting lever 17, which releases the cocking and driving disc 21, and the latter, in turn, actuates the shutter-blade driving ring 23 in the manner described above.

The invention has been described in connection with a photographic camera, whose controls 41 and 58 for diaphragm and shutter speed can be set selectively either at an "Auto" position, resulting in exposures with automatic setting of the shutter speed and diaphragm according to a predetermined time/diaphragm program or at a manually controlled setting range making possible the free selection of exposure time and diaphragm. However, in addition, the invention is of importance for cameras of every kind, which are settable to at least two work ranges by means of controls, whereby specific, mutually corresponding setting positions or setting ranges of the controls are associated with each work range. The arrangemen according to the present invention with the shutter release trigger will always have the advantage of eliminating faulty exposures owing to the incorrect setting at several mutually related setting positions or setting ranges of the setting members.

It will be understood that while the invention has been described in specific detail variations and modifications may be made without departing from the spirit of the invention or the scope of the appended claims:

I claim:

1. In a photographic camera comprising a first exposure setting control settable to a plurality of positions, a second exposure setting control settable to a plurality of positions, each of said positions of said second control corresponding to a specific position of said first control, said controls being separately settable to said corresponding positions as well as to non-corresponding positions, said camera further comprising a shutter and a shutter release trigger, means for preventing said shutter from operating to make a photographic exposure except when said controls are set to said corresponding positions, said means comprising: a first locking member connected to said first control to be moved thereby between a first position and a second position as said first control is set to different ones of its own positions; a second locking member connected to said second control to be moved thereby between a first position and a second position as said second control is set to different ones of its own positions, both of said locking members being in their respective first positions when said controls are in one set of said corresponding positions and both of said locking members being in their respective second positions when said controls are in another set of said corresponding positions, said first locking member engaging said shutter release trigger to prevent operation of said shutter when one of said members is in its first position and the other of said members is in its second position, said first locking member interfitting with second locking member when both of said members are in their respective first positions and when both of said members are in their respective second positions to permit said shutter release trigger to actuate said shutter.

2. The apparatus of claim 1 in which one of said locking members comprises a bar having a notch therein and the other of said locking members comprises a pin interfitting with said notch when both of said locking members are in their respective first positions and when both of said locking members are in their respective second positions.

3. The apparatus of claim 1 comprising a first cam attached to said first control to be operated thereby; a second cam connected to said second control to be operated thereby, each of said cams having at least two levels; a first cam follower connected to said first locking member and engaging said first cam to move said first member from its said first position to its said second position as said first control moves said first cam to change the point of contact of said first follower from one of the levels of said first cam to the other of said levels; and a second cam follower connected to said second locking member and engaging said second cam to move said second member from its said first position to its said second position as said second control moves said second cam to change the point of contact of said second follower from one of the levels of said second cam to the other of said levels.

4. The apparatus of claim 3 in which one of said controls is a shutter speed control ring having an automatic position and a range of manually controlled positions and the other of said controls is a diaphragm aperture control ring having an automatic position corresponding to the automatic position of said shutter speed control ring and a range of manually controlled positions corresponding to said range of manually controlled positions of said shutter speed control ring and each of said cams is on the respective one of said control rings.

5. The apparatus of claim 3 comprising resilient means biasing said first and second locking members apart to keep them from engaging each other except when said first locking member is engaged by said shutter release trigger.

6. The apparatus of claim 5 comprising a rigid member engaging said second locking member to absorb the pressure of said shutter release trigger when one of said locking members is in its first position and the other of said locking members is in its second position.

7. The apparatus of claim 6 comprising a first spring resiliently biasing said first locking member away from said rigid member and a second spring resiliently biasing said second locking member toward said rigid member.

8. The apparatus of claim 7 comprising: a first lever connected to said first cam follower to be pivoted thereby; a second lever articulately connected to said first lever to be moved thereby, said first locking member being connected to said second lever; a third lever connected to said second cam follower to be pivoted thereby; and a fourth lever articulately connected to said third lever and having said second locking member connected thereto to be moved thereby along a substantially planar path.

References Cited by the Examiner

UNITED STATES PATENTS 3,012,490 12/61 Takahama _____ 95—31
3,106,882 10/63 Maitani _____ 95—10

NORTON ANSHER, *Primary Examiner.*